United States Patent [19]

Jorgensen

[11] 4,428,492

[45] Jan. 31, 1984

[54] GANGABLE HOUSING

[75] Inventor: Robert W. Jorgensen, Niles, Mich.

[73] Assignee: Harvey Hubbell Incorporated, Orange, Conn.

[21] Appl. No.: 355,769

[22] Filed: Mar. 8, 1982

[51] Int. Cl.³ .............................................. H02G 3/10
[52] U.S. Cl. ................................... 220/3.94; 174/53; 174/58; 220/3.3; 220/23.4
[58] Field of Search .................... 220/3.2–3.94, 220/4 F, DIG. 25, 23.4; 33/174 G, DIG. 10; 174/52 R, 53, 57, 58; 46/25, 26; 403/11, 329

[56] References Cited

U.S. PATENT DOCUMENTS

| | | | |
|---|---|---|---|
| 1,326,498 | 12/1919 | Hayden | 220/3.94 |
| 1,531,542 | 3/1925 | Cogshall | 46/25 X |
| 1,817,307 | 8/1931 | Haase et al. | |
| 2,552,400 | 5/1951 | Brunia | 220/3.94 |
| 2,751,105 | 6/1956 | Eipper | 220/3.3 |
| 2,867,349 | 1/1959 | Parker, Jr. | 220/3.3 |
| 3,168,613 | 2/1965 | Palmer | 174/65 |
| 3,283,062 | 11/1966 | D'Entremont | 174/138 |
| 3,299,199 | 1/1967 | Mattingly | 174/50 |
| 3,317,073 | 5/1967 | Woerner | 220/4 B |
| 3,622,029 | 11/1971 | Ware | 220/3.7 |
| 3,728,470 | 4/1973 | Maier | 174/58 |
| 3,840,140 | 10/1974 | Tisbo | 220/3.8 |
| 3,863,037 | 1/1975 | Schindler et al. | 174/58 |
| 3,873,759 | 3/1975 | Schindler et al. | 174/65 |
| 3,999,676 | 12/1976 | Trebilcock et al. | 220/4 F |
| 4,062,470 | 12/1977 | Boteler | 220/3.3 |
| 4,202,457 | 5/1980 | Tansi | 220/3.3 |
| 4,214,668 | 7/1980 | Neff et al. | 220/3.3 |
| 4,265,365 | 5/1981 | Boteler | 220/3.3 |

FOREIGN PATENT DOCUMENTS

| | | | |
|---|---|---|---|
| 965155 | 6/1957 | Fed. Rep. of Germany | 220/23.4 |
| 611899 | 10/1960 | Italy | 220/4 F |
| 6516181 | 8/1966 | Netherlands | 220/23.4 |
| 15731 | of 1911 | United Kingdom | 220/3.2 |
| 808492 | 2/1959 | United Kingdom | 220/4 F |

*Primary Examiner*—William Price
*Assistant Examiner*—Gary E. Elkins
*Attorney, Agent, or Firm*—Jerry M. Presson; Walter C. Farley

[57] ABSTRACT

A housing is formed from components which can be assembled without other fasteners in various sizes. Components of only two shapes are required, one being a central U-shaped body and the other being a side wall member. The central body has a back and two end walls, the end walls having male and female coupling members along opposite edges. The back wall has parallel offset locking tabs on opposite edges. The side members also have male and female coupling members and locking tabs, each side member being attachable to either side of the central member. In addition, plural central members are attachable to each other in side by side relationship to form a housing of selectable width with a single undivided cavity.

16 Claims, 10 Drawing Figures

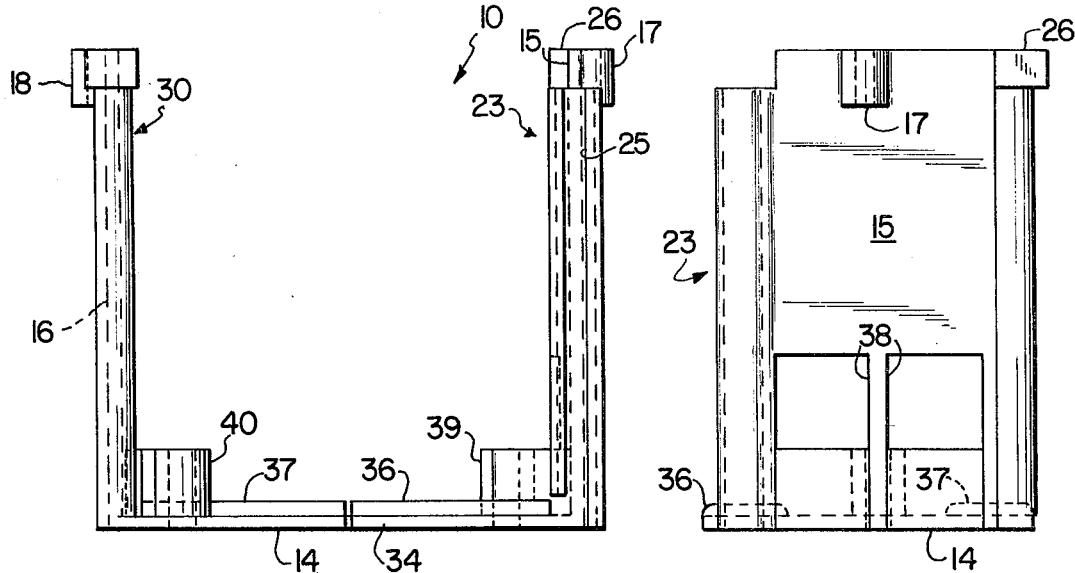
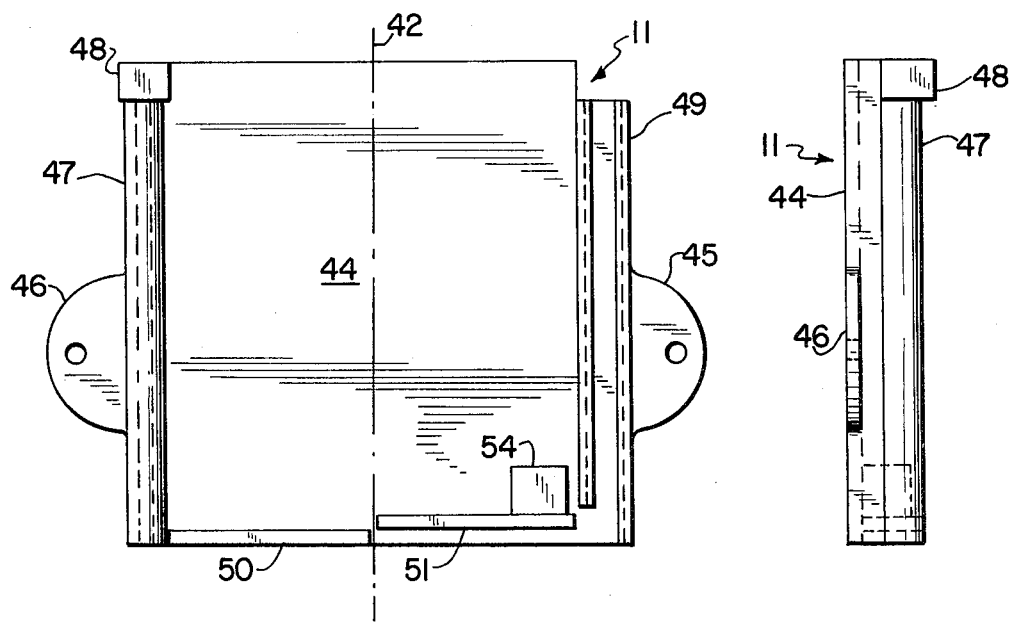

GANGABLE HOUSING

This invention relates to a housing for electrical components and particularly to a housing which is constructed so that it can be assembled in a plurality of sizes.

BACKGROUND OF THE INVENTION

It is common to make housings, such as outlet boxes, in various sizes to accommodate varying numbers and sizes of electrical components such as electrical outlets, switches, dimmer units, etc. Perhaps the most common situation in which this need arises in is the case of wall switches. A box of one size is made to receive one switch and boxes of other sizes are made to receive two, three or even more switch units. The multiple-switch boxes are normally the same height as those made to receive one switch, but the width is approximately an integral multiple of the width of the single-switch size.

This multiplicity of sizes creates manufacturing and inventory problems for everyone concerned with such items, including the fabricator, distributors, retailers and builders, because they must be concerned about producing and stocking an inventory of units in each size to adequately serve a market in which needs vary with the seasons and with economic conditions.

It has been recognized that it would be desirable to be able to form boxes for various purposes in such a way that more than one could be joined together to enlarge the total capacity, and examples of such devices are found in the following U.S. patents.

U.S. Pat. No. 1,817,307 Haase et al;
U.S. Pat. No. 3,622,029 Ware;
U.S. Pat. No. 3,728,4701 Maier;
U.S. Pat. No. 3,840,140 Tisbo;
U.S. Pat. No. 4,202,457 Tansi.

However, these prior art devices exhibit deficiencies which have prevented them from being fully practical or commercially acceptable.

BRIEF DESCRIPTION OF THE INVENTION

Accordingly, it is an object of the present invention to provide an improved structure for housing components from which housings of a plurality of different sizes can be assembled.

A further object is to provide components for a housing wherein the components have interfitting edges structures such that the edges of the components can be latched together without the need for additional fasteners in a way which prevents relative movement between the components.

Another object is to provide a housing which can be readily molded from a polymeric material and which requires only two differently shaped components, one being a central member and the other being a side member which can be inverted to form either a "left" or a "right" side wall.

Briefly described, the invention includes a housing structure comprising a central body comprising a generally U-shaped member having parallel end wall portions, each of said end wall portions having male coupling means along one side edge thereof and female coupling means along the other side edge thereof, said female coupling means on said end walls opening in opposite directions from each other, and first and second identical generally planar side wall units, each of said side wall units having substantially rectangular walls and having male coupling means along one edge thereof and female coupling means along an opposite side edge thereof, each of said coupling means on each of said side wall units facing perpendicular to the plane of the side wall portion and in the same direction, the distance between said end walls being selected such that either of said side walls can be coupled to either side of central body to form a housing.

In order that the manner in which the foregoing and other objects are attained in accordance with the invention can be understood in detail, particularly advantageous embodiments thereof will be described with reference to the accompanying drawings, which form a part of this specification and wherein:

FIG. 4 is a side elevation of the back end wall unit of the structure of FIGS. 1-3;

FIG. 5 is an end elevation of the back and end wall unit of FIG. 4;

FIG. 6 is an inside side elevation of a side wall unit of the structure of FIGS. 1-3;

FIG. 7 is an end view of the side wall unit of FIG. 6;

FIG. 10 is a partial sectional view along line 10—10 of FIG. 1.

Figure 1:
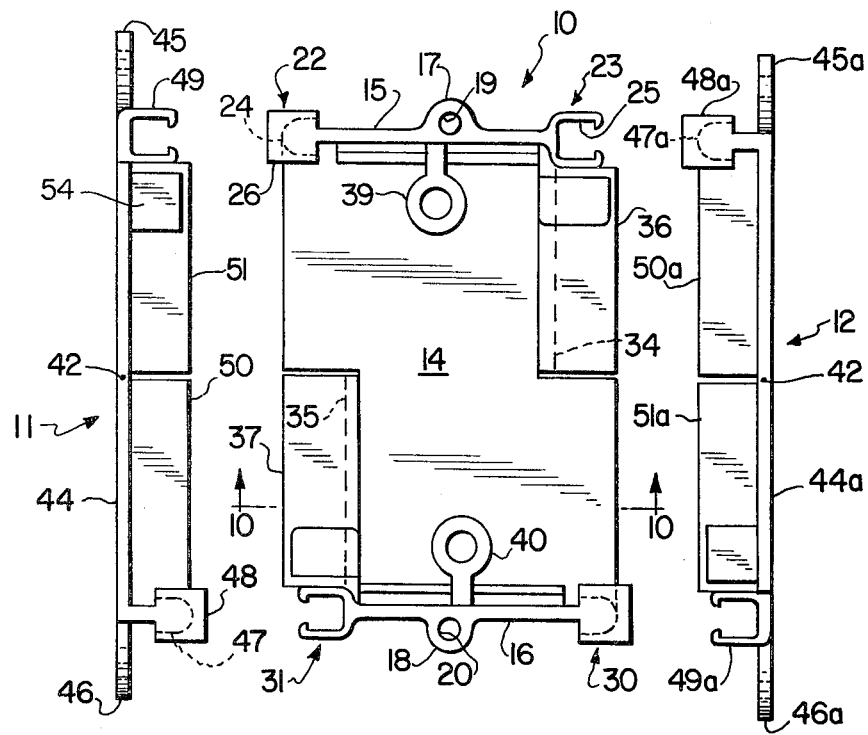
FIG. 1 is an exploded front elevation of a housing in accordance with the present invention.

Referring now to the drawings in detail, FIG. 1 shows an exploded view of a housing constructed in accordance with the present invention, the housing illustrated being a "single" size housing. The housing includes a central body, which is also shown by itself in FIGS. 4 and 5, indicated generally at 10 and two side wall bodies indicated generally at 11 and 12, one of which is separately shown in FIGS. 6 and 7. The central body includes a back or rear wall 14 which is substantially planar and end walls 15 and 16, the major portions of which are planar, the end walls extending substantially perpendicularly from back wall 14 and in the same direction. As will be recognized, this housing is primarily intended to receive a wall switch or outlet, or similar electrical device, and the front of the housing is therefore open. After installation of the electrical device, the front would normally be closed by a cover plate or the like, which does not form a part of the present invention and is not illustrated. End walls 15 and 16 are provided with thickened portions 17 and 18, respectively, having holes 19 and 20, respectively, to receive threaded fasteners for installation of the electrical device.

End wall 15 is provided with male and female coupling members indicated generally at 22 and 23, respectively. The male coupling member includes an elongated column 24, and the female coupling structure includes means defining an elongated recess 25 which is designed and dimensioned to receive and engage a male coupling column similar to 24. At one end of member 24 is a stop block 26 intended to inhibit longitudinal relative movement between the male member and a female coupling in one direction.

In a similar fashion, end wall 16 includes a male coupling member indicated generally at 30 extending along one edge of the wall and a female coupling member 31 along the other edge of the wall. It will be observed that male member 30 is substantially identical to male member 22, and female member 31 is identical to member 23, but these members are provided at oppositely directed edges of the end members, i.e., the female members 23 and 31 open in opposite directions.

For simplicity, it will be observed in the following discussion and in the remaining illustrations that all of the male coupling members and all of the female coupling members are identically shaped so that any male member and any female member are capable of interengagement.

Back wall 14, although generally planar, is provided with a locking tab arrangement at opposite edges thereof. As generally illustrated in FIG. 1, and as will be apparent from subsequent figures, each side edge of wall 14 is provided with a rectangular notch or recess, recess 34 being provided in the edge between coupling members 23 and 30, and recess 35 being provided between coupling members 22 and 31. These notches occupy approximately one half of the longitudinal dimension of the side edges, and the notches are covered, in the view of FIG. 1, by relatively short rectangular wall portions 36 and 37, respectively. These wall portions are parallel with wall 14 and are of the same thickness as wall 14 but lie in planes slightly offset from the plane of wall 14.

This relationship is more clearly illustrated in the partial sectional view of FIG. 10 in which it will be seen that the lower or outer surfaces of tabs 36 and 37 lie in the same plane as the upper or inner surface of wall 14, the tabs being integrally formed with the wall. As best seen in FIG. 5, the end walls are provided with generally rectangular scored punch-outs which can be selectively removed to provide openings 38 to permit wires to pass into the housing for connection to the device or devices therein.

Extending inwardly from end walls 15 and 16 and from back wall 14 are bosses 39 and 40 which have openings to receive mounting screws for mounting cable clamps. The outline of one such clamp 32 with its retaining screw 32a is shown in dash-dot lines in FIGS. 2 and 3, but it will be recognized that the clamp itself does not constitute part of the present invention.

It is also important to note that all of the structural portions of central body 10 which have been described are integrally and unitarily formed as a single body, the body conveniently being molded as a single unit from a polymeric material such as polyvinyl chloride or the like.

Side walls 11 and 12 are identical to each other, and this identity will be recognized by realizing that rotation of either wall about a central axis 42, extending perpendicular to the plane of the drawing, through an angle of 180° will place one in the orientation of the other, and the components thereof will be the same. This is a particularly important factor, because it permits the entire housing, and housings of a number of different widths, to be produced using only two differently shaped components, one or more components shaped like central body 10 and two or more components shaped like side walls 11 and 12. Side wall 11 will be discussed in some detail, and the same components of side wall 12 will be identified by the same reference numerals followed by the letter "a".

Wall 11 includes a generally planar wall portion 44 having end tabs 45 and 46 centrally located at the upper end lower ends thereof with holes therethrough for mounting the assembled housing. At the lower edge of planar portion 44 is a male coupling member 47 with an end block 48 and at the upper end of portion 44 is a female coupling member 49. Again, these coupling members are shaped the same as those on body 10. Adjacent the rear edge of portion 44 is a relatively short wall 50 which extends almost to the mid-point of portion 44, the rear surface of wall 50 being in the same plane as the rear edge of portion 44. A similar wall 51 occupies the remainder of the rear portion of the side wall, but wall 51 is offset toward the front edge of the side wall by a distance equal to the thickness of wall 50. Thus, walls 50 and 51 form locking tabs which are capable of cooperating with tab 37 and the adjacent edge portion of wall 14 to prevent relative movement of the components, when assembled, in a direction perpendicular to the plane of the drawing.

The relative relationship between walls 50 and 51 is more clearly visible in the side elevation of FIG. 6 which also shows axis 42 about which the side member is rotated to reverse its position from a "left" side orientation to a "right" side orientation. It will also be noted in FIG. 6, as well as in FIGS. 1 and 2, that there are block-like members 54 formed on the inner surface of wall 51 and as part of tabs 36 and 37. These are support blocks which may be hollow and which are provided to strengthen the walls, and provide supports for the cable clamps.

Figure 2:
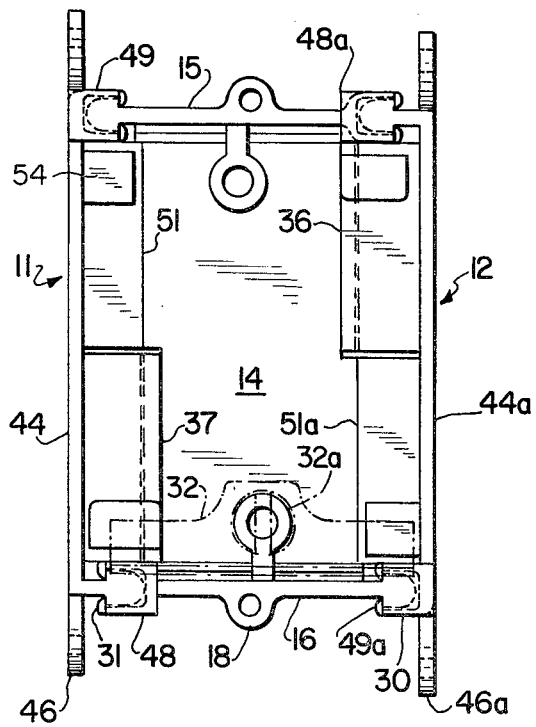
FIG. 2 is a front elevation of the housing of FIG. 1 with the components assembled.
Figure 3:
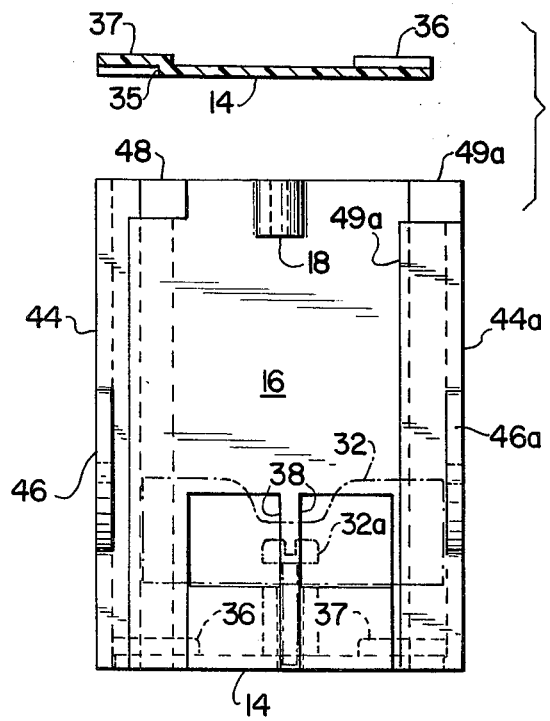
FIG. 3 is a bottom plan view of the assembled housing of FIG. 2.

FIG. 2 shows the elements of FIG. 1 fully assembled into a housing. The same reference numerals are used, and it will be readily apparent that the components interlock to form a five-sided housing, the only openings other than the open front, as seen in FIG. 3, being openings 38 which can be formed by the punch-outs, as described in end wall 16 and, as seen in FIG. 5, openings 38 in end wall 15 to permit wires to be inserted for connection to the electrical device within the housing.

Figure 8:
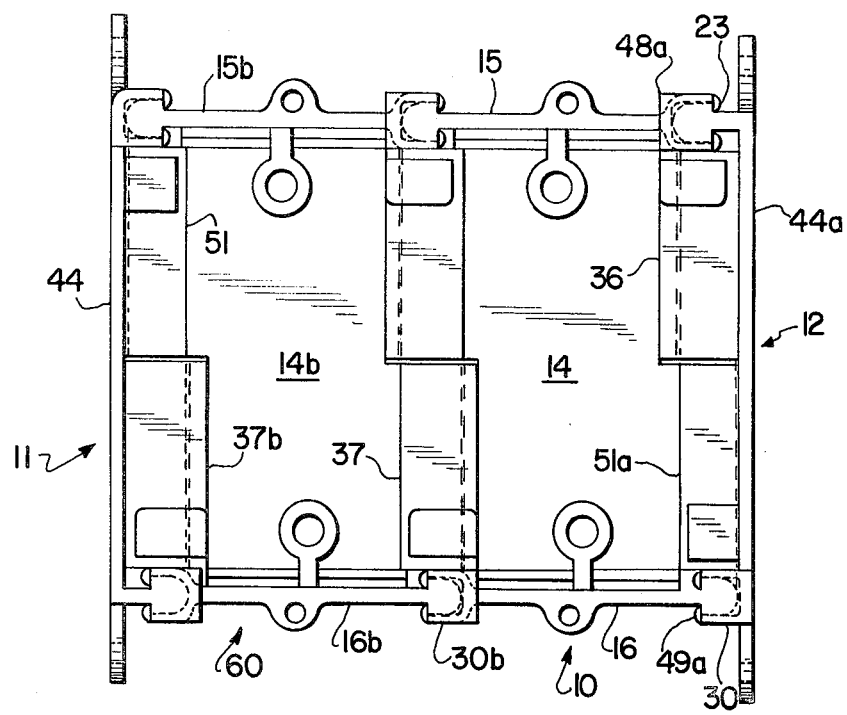
FIG. 8 is a front elevation of a housing in accordance with the invention showing the use of plural back and end wall units.

FIG. 8 illustrates the manner in which a housing can be formed having a greater volume and using exactly the same components as initially discussed in connection with FIG. 1. As will be readily recognized, the assembly of FIG. 8 includes central body 10 and side walls 11 and 12, and also includes a second central body 60 which is identical in every respect to body 10. The components of body 60 are identified by the same reference numerals used in connection with body 10 but with the addition of the letter "b". Because of the fact that the locking tabs 36 and 37, along with the adjacent edge portions of wall 14, lie in an orientation which is the same as walls 50 and 51, or 50a and 51a when the side wall unit is rotated, and because the male and female coupling members are symmetrically arranged, two central bodies such as 10 and 60 can be coupled together to form a wider U-shaped body which presents, at the opposite ends thereof, the same coupling members as does a single such body. Thus, having assembled members 10 and 60 together with locking tab 36b overlying an edge portion of wall 14, tab 37 overlying an edge portion of wall 14b, and the male and female coupling portions engaged, the wall members 11 and 12 can be coupled to the ends of the wider central unit in the same manner as in the case of FIG. 2. The result is a housing having approximately twice the volume of the housing of FIG. 2.

It will be apparent from this that substantially any number of bodies in the shape of bodies 10 and 60 can be assembled in side-by-side relationship, forming a housing having no internal divisions and having an internal volume which is approximately an integral multiple of the internal volume of the assembly shown in FIG. 2. The only change which is necessary to accomplish this is the addition of more of the U-shaped central bodies.

Thus, it will be readily apparent that only two kinds of parts needs to be stocked in an inventory in order to be able to produce housings capable, for example, of receiving one, two, three or more switch units, outlet units or other electrical devices.

Figure 9:
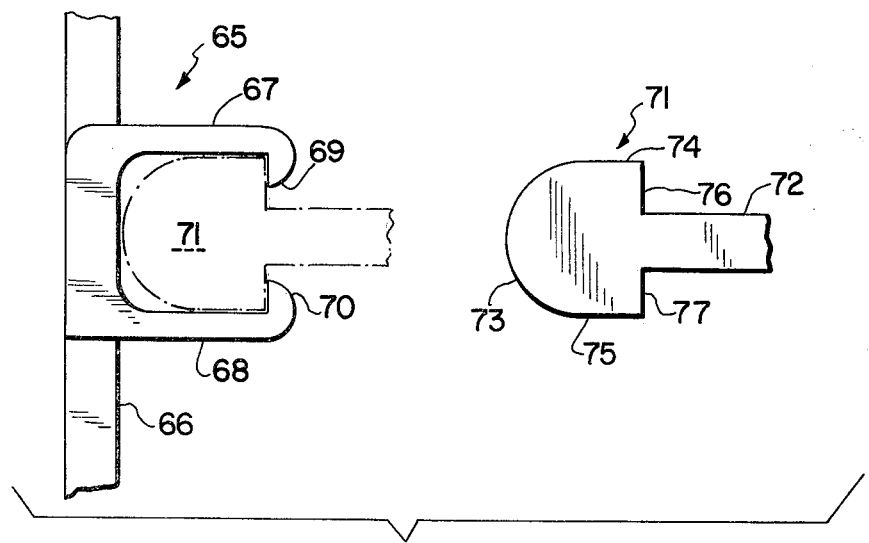
FIG. 9 is an enlarged exploded partial front elevation of interlocking elements usable in the structure of FIGS. 1-8.

FIG. 9 illustrates in somewhat greater detail the configuration of the male and female coupling members, this diagram being applicable to any such pair of members on central or wall units. As seen in FIG. 9, a female coupling member indicated generally at 65 is attached to a wall 66 which can, for example, be the wall of a side member analogous to wall 44. The female coupling member is elongated in a direction perpendicular to the plane of the drawing and has two parallel arms 67 and 68 extending perpendicular to wall 66. At the distal end of arms 67 and 68 are inwardly directed hook members 69 and 70, respectively, forming a somewhat rectangular C-shaped opening. Arms 67 and 68 are formed from a polymeric material, as is the rest of the structure, such as polyvinyl chloride which is relatively stiff but has sufficient resilence to permit the arms to be temporarily bent outwardly away from each other.

The male coupling member 71 which is used in conjunction therewith, and which can be, for example, along the edge of an end wall 72 analogous to walls 15 or 16, has a rounded end portion 73 which is substantially semi-circular in cross section. This portion merges smoothly into straight, parallel side portions 74 and 75 which terminate at shoulders 76 and 77 extending inwardly to wall 72.

As the male member is inserted into the female member, arms 67 and 68 bend outwardly to permit the rounded end portion to pass between hooks 69 and 70, and after full insertion the hooks snap back to engage shoulders 76 and 77 to prevent withdrawal except upon the application of sufficient force to again bend the legs outwardly and overcome the hooking retention. It will be noted that, while these members can be disassembled and reassembled, they are not intended for repeated removal and insertion. Thus, they are intentionally formed so that significant force is required to disassemble a box once it has been fully assembled and put into use.

While certain advantageous embodiments have been chosen to illustrate the invention it will be understood by those skilled in the art that various changes and modifications can be made therein without departing from the scope of the invention as defined in the appended claims.

What is claimed is:

1. A housing structure, comprising
a first central body comprising a generally L-shaped member having a back wall extending perpendicularly between parallel end wall portions, each of said end wall portions having male coupling means along one side edge thereof and female coupling means along the other side edge thereof, said female coupling means on said end wall portions opening in opposite directions from each other, said back wall including a generally planar member having side edges extending between said end wall portions, said male and female coupling means on said end wall portions extending laterally to an extent equal to or less than said planar member side edges; and
first and second identical generally planar side wall units, each of said side wall units having a substantially rectangular wall portion and having male coupling means along one edge thereof and female coupling means along an opposite edge thereof, each of said coupling means on each of said side wall units facing perpendicular to the plane of the side wall portions and in the same direction;
the distance between said end wall portions being selected such that either of said side wall units can be coupled to either side of said first central body to form a housing.

2. A structure according to claim 1 wherein
a second central body, identical in shape to said first central body, is engagable with said first central body in side-by-side relationship between said first central body and one of said side wall units without gaps therebetween.

3. A structure according to claim 2 wherein each of said male coupling means includes means for preventing longitudinal motion relative to said female coupling means in one direction.

4. A structure according to claim 3 wherein said back wall includes
locking tab means engagable with said side walls.

5. A structure according to claim 3 wherein said means for preventing longitudinal movement on said first central body are located on the same end of said end wall portions.

6. A structure according to claim 5 where said means for preventing longitudinal movement on said end wall portions are located on ends thereof remote from said back wall.

7. A structure according to claim 1 wherein said back wall includes
means along one of said back wall side edges defining a forwardly offset wall portion adjacent one of said end wall portions, and
means along the other of said back wall side edges defining a forwardly offset wall portion adjacent the other of said end wall portions;
and wherein each of said side wall units includes
first and second wall sections extending perpendicularly from said planar rectangular member close to a rear edge portion thereof,
said wall sections being parallel with each other and one of said wall sections being forwardly offset to mate with said offset wall portion or said back wall.

8. An open-front housing structure, comprising first and second identical side wall units, each of said side wall units including
a generally planar rectangular member having a rear edge portion and top and bottom edge portions,
means extending perpendicularly from and along one of said top and bottom edge portions defining a male coupling member, and
means extending perpendicularly from and along the other of said top and bottom edge portions defining a female coupling member, said female coupling member being engagable with a member formed like said male coupling member;

at least one integrally formed generally U-shaped unit
including a back wall portion and first and second
end wall portions extending perpendicularly and in
the same direction from said back wall portion,
said back wall portion including a generally planar
member having parallel side edges extending
between said end wall portions, and
each of said end wall portions including means
defining male and female coupling members
along opposite side edges thereof, respectively,
the male coupling member on one end wall portion facing in the same direction as the female
coupling member on the other end wall portion,
the male and female coupling members of said U-shaped unit being engagable with the female and
male coupling members of said first and second
side wall units to form an open-front housing, and
not extending laterally beyond said planar member
side edges.

9. A structure according to claim 8 wherein each of said male coupling members comprises
an elongated column having a generally semicircular outwardly facing surface and inwardly facing shoulders, and
a stop block at one end of said column, said block being larger in cross-section than said column.

10. A structure according to claim 9 wherein each of said female coupling members includes
first and second generally parallel elongated resilient walls spaced apart from each other to define an elongated slot dimensioned to receive said column, the length of said slot being substantially equal to the length of said column; and
inwardly extending hook means along the distal edge of each of said elongated walls for defining an entrance gap, the width of said gap being less than the width of said column,
whereby said column can be transversely pushed into said slot between said hook means by resiliently outwardly deforming said walls.

11. A structure according to claim 10 wherein said back wall portion includes
means along one of said back wall portion side edges defining a forwardly offset wall portion adjacent one of said end wall portions, and
means along the other of said back wall portion side edges defining a forwardly offset wall portion adjacent the other of said end wall portions;
and wherein each of said side wall units includes
first and second wall sections extending perpendicularly from said planar rectangular member close to the rear edge portion thereof,
said wall sections being parallel with each other and one of said wall sections being forwardly offset to mate with said offset wall portion of said back wall portion.

12. A structure according to claim 11 wherein said end wall portions include enlarged bosses with openings therein to receive fasteners for mounting an electrical device in said housing.

13. A structure according to claim 8 wherein
said back wall portion includes
means along one of said back wall portion side edges defining a forwardly offset wall portion adjacent one of said end wall portions, and
means along the other of said back wall portion side edges defining a forwardly offset wall portion adjacent the other of said end wall portions;
and wherein each of said side wall units includes
first and second wall sections extending perpendicularly from said planar rectangular member close to said rear edge portion thereof,
said wall sections being parallel with each other and one of said wall sections being forwardly offset to mate with said offset wall portion or said back wall portion.

14. A structure according to claim 9 wherein said stop blocks on said U-shaped unit are located on the same end of said end wall portions.

15. A structure according to claim 14 wherein said stop blocks on said end wall portions are located on ends thereof remote from said back wall portion.

16. An open-front housing structure comprising
first and second identical side wall units, each of said side wall units including
a generally planar rectangular member having a rear edge portion and top and bottom edge portions,
means extending perpendicularly from and along one of said top and bottom edge portions defining a male latch member,
means extending perpendicularly from and along the other of said top and bottom edge portions defining a female latch member, said female latch member being engagable with a member formed like said male latch member, and
at least two perpendicularly extending laterally offset short walls along said rear edge portion;
each of said side wall units being rotatable about a central axis parallel with said top and bottom edge portions to reverse the positions of said top and bottom edge portions so that the means defining said latch members and short walls face each other in matable relationship; and
at least one integrally formed generally U-shaped unit including a back wall portion and first and second end wall portions extending perpendicularly and in the same direction from said back wall portion,
said back wall portion including a generally planar member having side edges extending between said end wall portions, each said side edge including locking tab means with offset walls matable with said short walls, and
each of said end wall portions including means defining male and female latch members along opposite side edges thereof, respectively, the male latch member on one end wall portion facing in the same direction as the female latch member on the other end wall portion,
said male and female latch members on said end wall portions extending laterally to an extent equal to or less than said back wall portion side edges,
said U-shaped unit being selectively engagable with at least one of an identical, similarly oriented U-shaped unit and at least one side wall unit without gaps therebetween to form an open-front housing having a width substantially equal to an integral multiple of the width of one U-shaped unit.

* * * * *